United States Patent [19]
Raff et al.

[11] 3,847,317
[45] Nov. 12, 1974

[54] AUTOMOBILE BICYCLE RACK

[75] Inventors: Samuel Joseph Raff, Chevy Chase, Md.; Robert Page Burruss, Jr., Washington, D.C.; Stanley Morris Lebow, Greenbelt; Stephen Phillips Callahan, Chevy Chase, both of Md.

[73] Assignee: Quality Engineered Specialty Products, Inc., Greenbelt, Md.

[22] Filed: Apr. 20, 1972

[21] Appl. No.: 245,726

[52] U.S. Cl. .................................. 224/42.03 B
[51] Int. Cl. ................................ B60m 9/10
[58] Field of Search...224/42.03 B, 42.03 R, 42.03 A, 224/42.1 E, 42.1 F, 42.1 R, 29 R, 42.32, 42.43, 42.45 R

[56] References Cited
UNITED STATES PATENTS
2,573,187  10/1951  DeSilets ..................... 224/42.03 R
2,762,542  9/1956  Hodgeman ................. 224/42.03 R
3,204,839  9/1965  Yuda ........................... 224/42.1 R
3,275,206  1966  Croft ........................... 224/42.03 B FOREIGN PATENTS OR APPLICATIONS
159,716  7/1957  Sweden ..................... 224/42.03 R Primary Examiner—Robert J. Spar
Assistant Examiner—Jerold M. Forsberg
Attorney, Agent, or Firm—Witherspoon and Lane

[57] ABSTRACT

A bicycle carrier adapted for mounting on an automobile comprising two separate components, namely, an H-frame assembly attachable to the rear bumper and a U-frame assembly connectable to the H-frame and further resting on the trunk lid.

4 Claims, 5 Drawing Figures

AUTOMOBILE BICYCLE RACK

SUMMARY OF THE INVENTION

This invention relates to bicycle carriers adapted for mounting on an automobile and more particularly to a combination carrier having a section fitting on the rear bumper and another section detachably connected thereto and further supported by the automobile's trunk lid.

There has long been a need for a bicycle carrier which is versatile, relatively inexpensive and readily mountable and demountable. It is also necessary that consideration be given to the fact that vehicle bumpers vary tremendously in shape, consequently the carrier must be adaptable for the majority of bumpers in order to provide desirable marketing.

In view of the foregoing it is an object of this invention to provide a bicycle carrier for use on an automobile wherein the carrier is easily attached to and removed from the automobile.

It is another object of this invention to provide a a carrier assembly comprising two components wherein one may be used alone.

It is yet another object of this invention to provide a bicycle carrier wherein adjustments may be made to the unit for a specific bumper configuration and maintained even though the carrier is removed from the bumper.

It is a still further object of this invention to provide a bicycle carrier which is sturdy and adapted to carry as many as five bicycles and is yet economical from a construction standpoint.

IN THE DRAWINGS

DETAILED DESCRIPTION OF THE INVENTION

Figure 1:
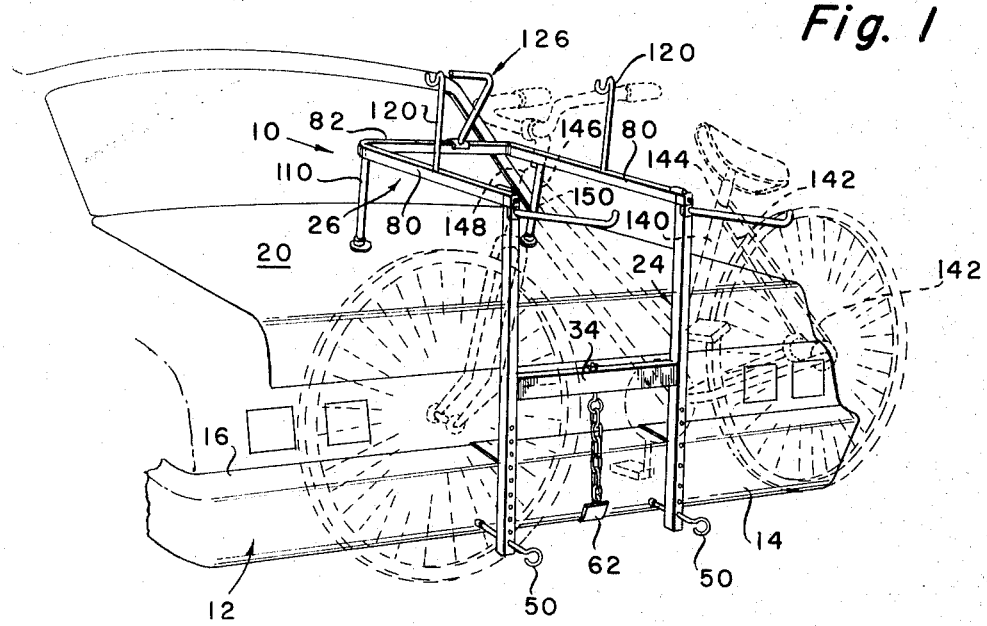
FIG. 1 is a perspective view illustrating the complete bicycle rack mounted on an automobile with a bicycle carried on the H-frame shown in phantom.
Figure 2:
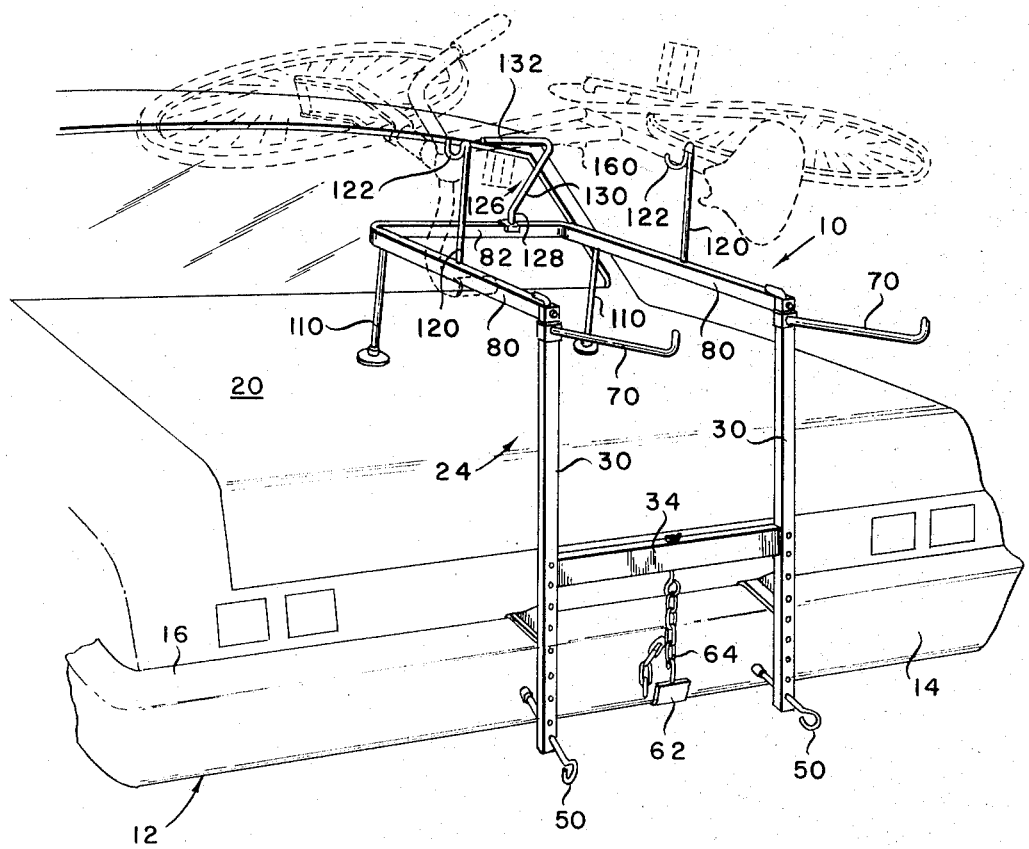
FIG. 2 is a perspective view of the complete bicycle rack mounted on an automobile with a bicycle mounted on the U-frame in phantom.
Figure 4:
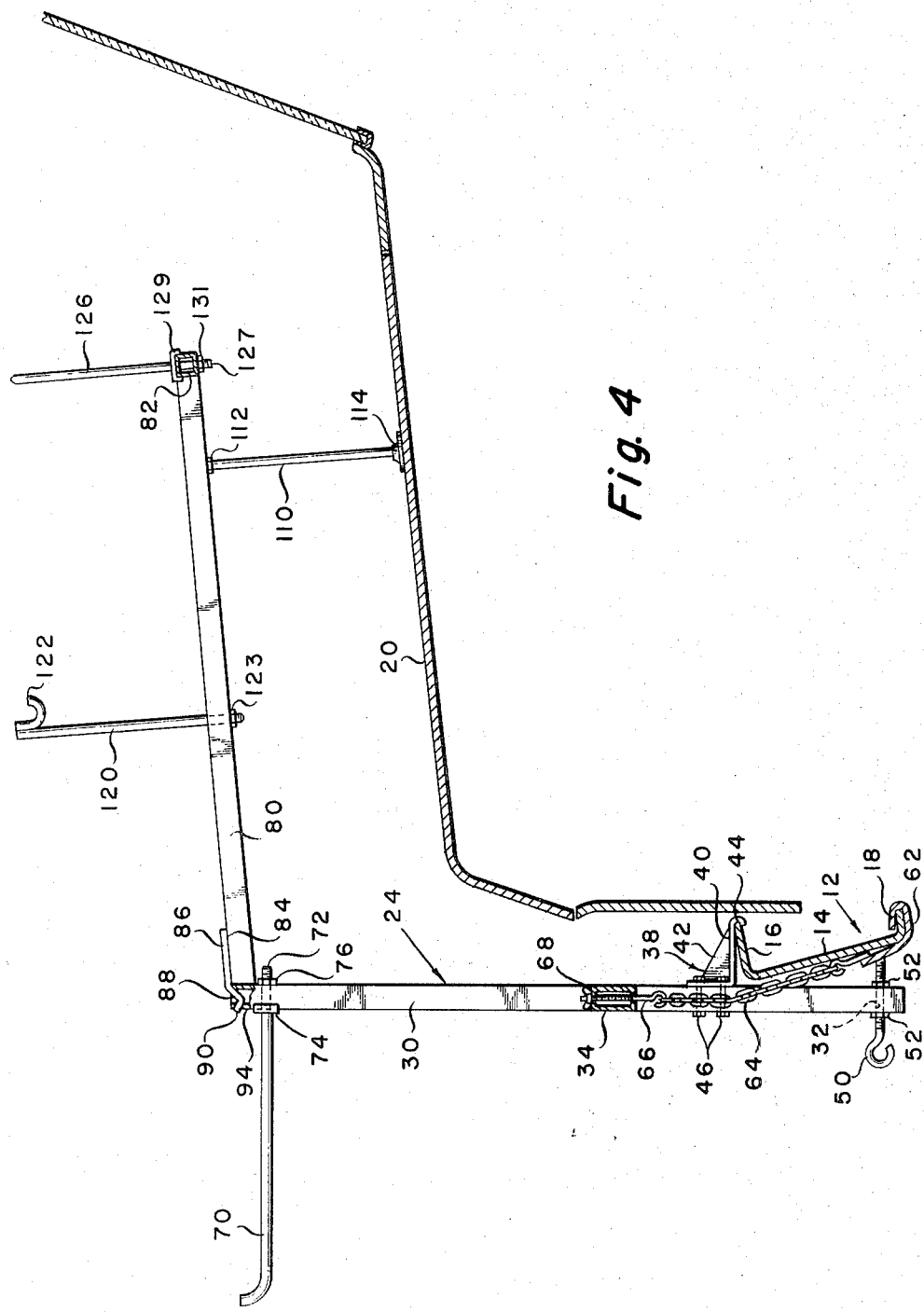
FIG. 4 is a cross sectional view taken along line 4—4 of FIG. 3 illustrating details of the elements employed for attaching the rack to the vehicle bumper.

As best illustrated in FIGS. 1, 2 and 4 of the drawings, the bicycle rack 10 is designed for attachment to an automobile having a generally horizontal rear bumper 12 with a vertical face 14 terminating in an upper flange 16 and a lower flange 18. The automobile has a more or less conventional somewhat curved trunk lid 20. The bicycle rack 10 comprises a H-frame assembly 24 mounted on the bumper 12 and a U-frame assembly 26 detachably secured to the H-frame and supported otherwise by the trunk lid 20.

Figure 3:
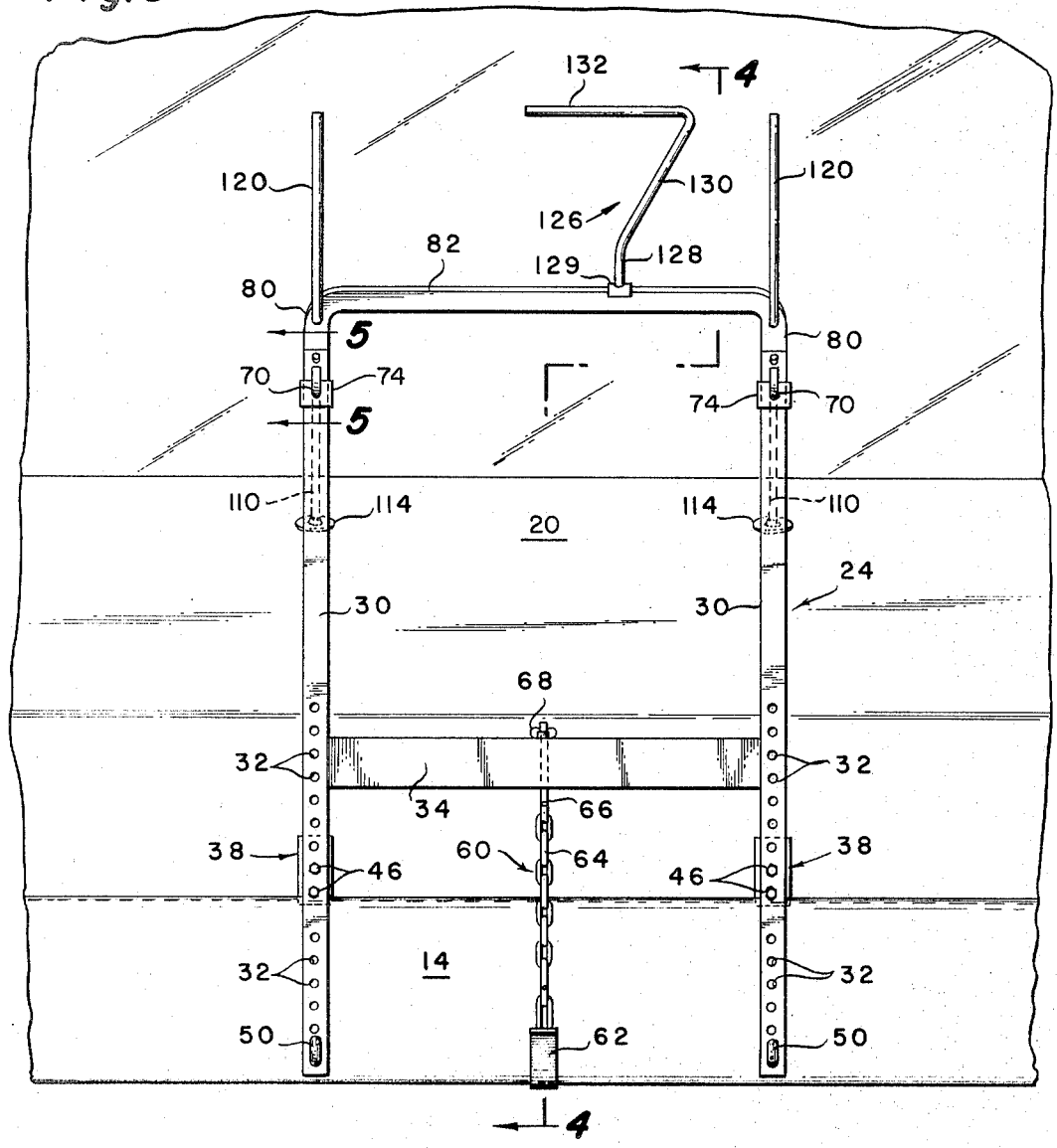
FIG. 3 is an elevational view of the complete rack as mounted on an automobile looking toward the front of the auto.

Referring specifically to the H-frame assembly 24 as illustrated in FIGS. 3 and 4, said assembly comprises a pair of spaced vertical supports 30, in the form of rectangular channels, each having a plurality of through holes 32 vertically spaced in the lower portion thereof.

A cross piece 34 is connected to parallel supports 30 to maintain same in such position. The cross piece may be rectangular in cross section.

Each support 30 mounts a bumper engaging and gripping bracket 38, said bracket consists of a right angle member 40 with a side brace plate 42 secured thereto and further has a hook portion 44 at its free end which is adapted to grip the bumper upper flange 16. Each bracket 38 is secured to its respective support 30 by means of a pair of nut and bolt assemblies 46 fitting through holes 32. The plurality of holes 32 provide for vertical adjustment of the bracket.

An adjusting screw 50 is mounted in the lower end portion of the support 30. Specifically, the adjusting screw 50 is an eyebolt which is passed through one of the lower set of holes 32 in the support and held in place by cooperating nuts 52—52 on each side of the support. As shown in FIG. 4, the extremity of the adjusting screw engages the lower portion of the bumper face 14 to control the vertical attitude of the support 30.

A rack securing assembly 60 is secured to the cross piece 34 intermediate supports 30. The rack securing assembly includes a hook 62 adapted to grip the bumper lower flange 18 and is connected to a flexible chain 64 which is in turn secured to a threaded bolt 66 passing through cross piece 34 and held in position by wing nut 68. It is advantageous that the bolt 66 be in the form of an open or hook bolt as well as an eyebolt for obvious reasons.

Each support 30 is provided with a rearwardly extending plastic coated arm 70 adjacent its upper end. The arm 70 has a threaded end 72 which passes through a hole in the support while a bracket 74 secured to the art 70 engages the support on one side and a nut 76 is threaded on end 72 to fasten the arm to the support 30.

Figure 5:
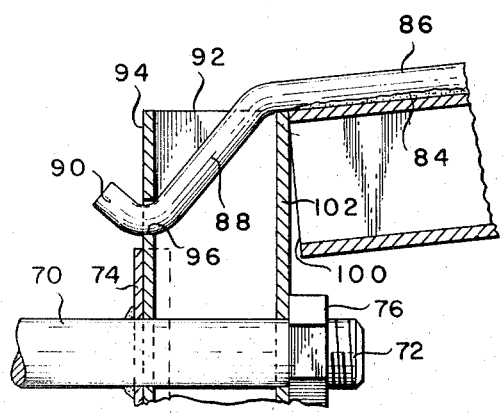
FIG. 5 is a cross sectional view taken along line 5—5 of FIG. 3 illustrating the means for connecting the U-frame to the H-frame.

The U-shaped frame assembly 26 is detachably secured to the H-frame assembly 24 and is further supported by the trunk lid 20. The U-shaped frame assembly comprises a U-frame having parallel legs 80—80 with a connecting curved portion 82. This frame may also be rectangular in cross section. As best shown in FIG. 5, the free ends of the legs are connected to the top end of the supports 30 as follows. The end portion of upper face 84 of each leg 80 has a connecting pin 86 secured thereto, as by welding. This connecting pin 86 has a straight portion which is affixed to face 84 of the leg 80 and a downwardly curved or offset portion 88 terminating in an upwardly turned hook portion 90. In order to accommodate this arrangement, the top end 92 of each support 30 is open while the rearward face 94 of the support 30 is provided with a hole 96 spaced a distance from the top such as to accommodate the offset 88 in connecting pin 86.

As best shown in FIGS. 4 and 5, the U-shaped frame assembly 26 is connected to the H-frame assembly 24 by aligning the legs 80 with the supports 30 and then slightly elevating the legs to allow the connecting pins 86 to be fitted through holes 96 whereupon the U-frame may be lowered so that the ends 100 of the legs 80 rest on the rear face 102 of each support 30. In order to support the U-shaped frame on the trunk lid 20 each leg 80 is provided with a downwardly extending rest 110 having a threaded end which is threadedly received in each leg and held in locking condition by nut 112. The end engaging the truck lid 20 is provided with a suction cup 114 to stabilize the positioning on the trunk lid.

In order to provide support for a second bicycle on the U-shaped frame assembly 26 a tri-point supporting combination is used. More specifically, each leg 80 mounts an upwardly extending carrier member 120 terminating in a generally U-shaped element 122 adapted to receive a portion of a bicycle frame. The third point of support is provided by a carrier rod 126 mounted on the curved portion 82 of the U-shaped frame. The carrier rod 126 has a generally vertical portion 128, an offset section 130 and a horizontal portion 132. The carrier members 120 and carrier rod 126 may be secured to the U-shaped frame in any manner, however, one which provides for easy take-down is desirable. As shown, each carrier member 120 is threadedly mounted in the leg 80 and held in position by a nut 123 while the carrier rod 126 has its end 127 threaded and is further provided with a fixed bracket 129 fitting over the upper face of curved portion 82. A nut 131 is tightened against the lower face of the curved portion 82 to secure the carrier rod thereto.

With regard to use and mounting of the rack 10, it should be noted that the H-frame assembly 24 may be used alone or with the U-frame assembly 26. In mounting the rack on a vehicle, the H-frame assembly is affixed first and in the following manner. The H-frame is positioned on bumper 12 fitting the bumper brackets 38 over the upper flange 16 of the bumper as in FIG. 4. After this each adjusting screw 50 is turned so its end firmly engages the face of the bumper whereby the supports 30 are in a generally vertical attitude. After this the hook 62 is fitted over the lower flange 18 of the bumper 12 and by means of wing nut 68 tension is developed in the flexible chain so as to firmly affix the H-frame assembly to the bumper 12. Mounting of the U-frame assembly 26 is very quick and easy, the legs 80 of the U-frame are aligned with the supports 30 and the forward end of the U-frame elevated so that each connecting pin 86 may be introduced into the adjacent hole 96 whereupon the U-frame may be lowered so that the ends 100 of the legs 80—80 will abut the face 102 of the supports 30—30 and the hook portion 90 of the connecting pin 86 will fit in hole 96. In this position the suction cups 114 will be adhered to the trunk lid 20 and thus the U-frame assembly will be secured in place ready for use.

The manner in which bicycles are carried on the H-frame assembly 24 is illustrated in FIG. 1 wherein a single bicycle is mounted thereon. Specifically, a girl's bicycle is shown wherein an angular main frame member 140 together with downwardly extending axle support arms 142 form a V-144 to receive arm 70 and on the other end forward main frame member 146 together with the fork support 148 form another V-150 to receive the other arm 70. Suitable tiedowns or the like may be employed to further secure the bicycle to the H-frame. Obviously, more than one may be mounted on the H-frame.

With regard to the U-frame assembly 26, reference is made to FIG. 2 wherein a girl's bicycle is mounted thereon. It should be noted that the carrier member 120 may be rotated so that their U-shaped ends 122 will best accommodate the appropriate frame element of the bicycle. The first bicycle to be carried by the U-frame is laid directly thereon, that is the bicycle frame rests on the U-frame with the seat facing the rear of the vehicle. When mounting the second bicycle, it is necessary to employ the carrying members 120 and the carrier rod 126. The somewhat vertical main frame member 140 is held in U-shaped end 122 which must be positioned to receive same while another main frame member 146 is carried in the U-shaped end 122 of the other carrier member. The pedal crank 160 is positioned to rest on the horizontal portion 132 of the carrier rod 126. As before, tiedowns or the like should be used to firmly position the bicycle. It should be noted that the bicycles mounted on the U-frame should head in opposite directions but the seat should always be toward the rear of the vehicle.

The mounting of boys' bicycles is quite easy since there is a horizontal frame member located between the saddle and fork support which may be received by the U-shaped ends 122 on carrying members 120 on the U-frame. With regard to the H-frame assembly, the arms 70 will support the horizontal frame of the boy's bicycle.

It should be especially noted once the adjusting screws 50 have been set properly and the nuts 52—52 tightened the H-frame is easily mounted and demounted merely by affixing or removing the hook 62 from the bumper flange 18. This ease of use is a very important feature of this invention.

What is claimed is:

1. A bicycle rack adapted for mounting on the rear end of an automobile having a trunk lid and a horizontal bumper with a face portion terminating in an upper and a lower flange, said bicycle rack comprising;

a frame assembly including a pair of spaced parallel supports, a cross piece connecting the two supports and maintaining them in spaced relation, a bumper engaging and gripping bracket secured to each support and adapted to fit on and engage the upper flange of the bumper, an adjusting screw threadedly carried by each support below the bumper bracket, said adjusting screw being adapted to engage the bumper below the bumper bracket to control the vertical attitude of its respective support, a rack securing assembly connected to the frame cross piece, said assembly comprising a hook means adapted to engage the lower flange of the bumper and adjustable means connecting the hook to the cross piece to maintain tension between the hook and cross piece to retain the rack on the bumper, a carrying arm affixed to and extending outwardly from each support to carry one or more bicycles, and a U-frame assembly connected to the frame assembly, said U-frame assembly comprising:

a U-frame having a pair of parallel legs and a curved portion connecting same, means on the legs for connecting same to the frame supports, a rest connected to and extending downwardly from each leg of the U-frame and adapted to engage the trunk lid, and a tri-point support means extending upwardly from the U-frame.

2. The invention as set forth in claim 1 and wherein the tri-point support means comprises a rotatable carrier extending upwardly from each leg of the U-frame, each rotatable carrier having a U-shaped end, and a support rod extending upwardly from the curved portion of the U-frame.

3. A bicycle rack adapted for mounting on the rear end of an automobile having a trunk lid and a horizontal bumper with a face portion terminating in an upper and a lower flange, said bicycle rack comprising:
- a frame assembly including a pair of spaced parallel supports, a cross piece connecting the two supports and maintaining them in spaced relation,
- a bumper engaging and gripping bracket secured to each support and adapted to fit on and engage the upper flange of the bumper,
- an adjusting screw threadedly carried by each support below the bumper bracket, said adjusting screw being adapted to engage the bumper below the bumper bracket to control the vertical attitude of its respective support,
- a rack securing assembly connected to the frame cross piece, said assembly comprising a hook means adapted to engage the lower flange of the bumper and adjustable means connecting the hook to the cross piece to maintain tension between the hook and cross piece to retain the rack on the bumper, and
- a U-frame assembly providing a three point support for a bicycle connected to the H-frame and resting on the trunk lid, said U-frame assembly comprising:
- a U-frame having a pair of parallel legs with a curved portion connecting same, means on the free ends of the legs for connecting said legs to the upper ends of the H-frame supports,
- a rest connected to each U-frame leg and adapted to engage the trunk lid,
- a carrier member extending upwardly from each U-frame leg forming two of the points of support for the bicycle, said carrier member having a generally U-shaped termination with the open portion facing upwardly, and
- a carrier rod connected to and extending upwardly from the curved portion of the U-shaped frame to provide the third point for bicycle support.

4. The invention as set forth in claim 3 and wherein the carrier member is rotatable to accommodate different bicycle frame configurations.

* * * * *